United States Patent
Brinton et al.

(10) Patent No.: US 12,282,740 B2
(45) Date of Patent: Apr. 22, 2025

(54) DISTRIBUTED COMPUTING ARCHITECTURE FOR INTENT MATCHING

(71) Applicant: Zoom Communications, Inc., San Jose, CA (US)

(72) Inventors: Connor Isaac Brinton, Holly Springs, NC (US); Victor The Vong, Dublin, CA (US)

(73) Assignee: Zoom Communications, Inc., San Jose, CA (US)

( * ) Notice: Subject to any disclaimer, the term of this patent is extended or adjusted under 35 U.S.C. 154(b) by 326 days.

(21) Appl. No.: 17/978,103

(22) Filed: Oct. 31, 2022

(65) Prior Publication Data

US 2024/0143930 A1 May 2, 2024

(51) Int. Cl.
*G06F 40/30* (2020.01)
*G06F 40/216* (2020.01)
*G06F 40/295* (2020.01)
*H04M 3/523* (2006.01)

(52) U.S. Cl.
CPC ............ *G06F 40/30* (2020.01); *G06F 40/216* (2020.01); *G06F 40/295* (2020.01); *H04M 3/5234* (2013.01)

(58) Field of Classification Search
CPC ...... G06F 40/216; G06F 40/295; G06F 40/30; H04M 3/5234
See application file for complete search history.

(56) References Cited

U.S. PATENT DOCUMENTS

| | | | |
|---|---|---|---|
| 10,791,158 B2 * | 9/2020 | Buchanan | H04L 67/563 |
| 11,061,700 B2 | 7/2021 | Jernigan et al. | |
| 2013/0332438 A1 * | 12/2013 | Li | G06F 16/24578 |
| | | | 707/706 |
| 2018/0157721 A1 * | 6/2018 | Khaitan | G06F 16/986 |
| 2018/0365026 A1 * | 12/2018 | Jernigan | G06F 9/453 |
| 2019/0102078 A1 * | 4/2019 | Bhatt | G06F 3/0481 |
| 2019/0108836 A1 * | 4/2019 | Kato | G10L 15/22 |
| 2021/0035572 A1 * | 2/2021 | D'Amato | G06F 3/167 |
| 2021/0083994 A1 * | 3/2021 | Pan | G06F 18/23213 |
| 2021/0174783 A1 * | 6/2021 | Wieman | G10L 13/02 |
| 2023/0033887 A1 * | 2/2023 | Luthra | G06F 16/24522 |
| 2023/0199118 A1 * | 6/2023 | Koneru | G10L 15/26 |
| | | | 379/88.01 |

OTHER PUBLICATIONS

International Search Report and Written Opinion mailed on Dec. 15, 2023 in corresponding PCT Application No. PCT/US2023/034552.
Configure the Aggregation Layer, Kubernetes, https://kubernetes.io/docs/tasks/extend-kubernetes/configure-aggregation-layer/, Jul. 21, 2022, 6 pages.

(Continued)

*Primary Examiner* — Eric Yen
(74) *Attorney, Agent, or Firm* — Young Basile Hanlon & MacFarlane, P.C.

(57) ABSTRACT

A server transmits a query received from a user device to multiple deployment engines, each deployment engine being associated with an intent. The server receives, from each of a subset of the multiple deployment engines, a score representing a likelihood that the query matches to the associated intent. The server transmits, to the user device, a message comprising representations of intents for which the score is within a predefined range.

20 Claims, 9 Drawing Sheets

(56) References Cited

OTHER PUBLICATIONS

Controllers, Kubernetes, https://kubernetes.io/docs/concepts/architecture/controller/, Jun. 14, 2021, 3 pages.
Kubernetes API Aggregation Layer, Kubernetes, https://kubernetes.io/docs/concepts/extend-kubernetes/api-extension/apiserver-aggregation/, Oct. 8, 2022, 1 page.

* cited by examiner

DISTRIBUTED COMPUTING ARCHITECTURE FOR INTENT MATCHING

FIELD

This disclosure relates to distributed computing techniques for intent matching, which may, for example, be performed to match a natural language query to an intent.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
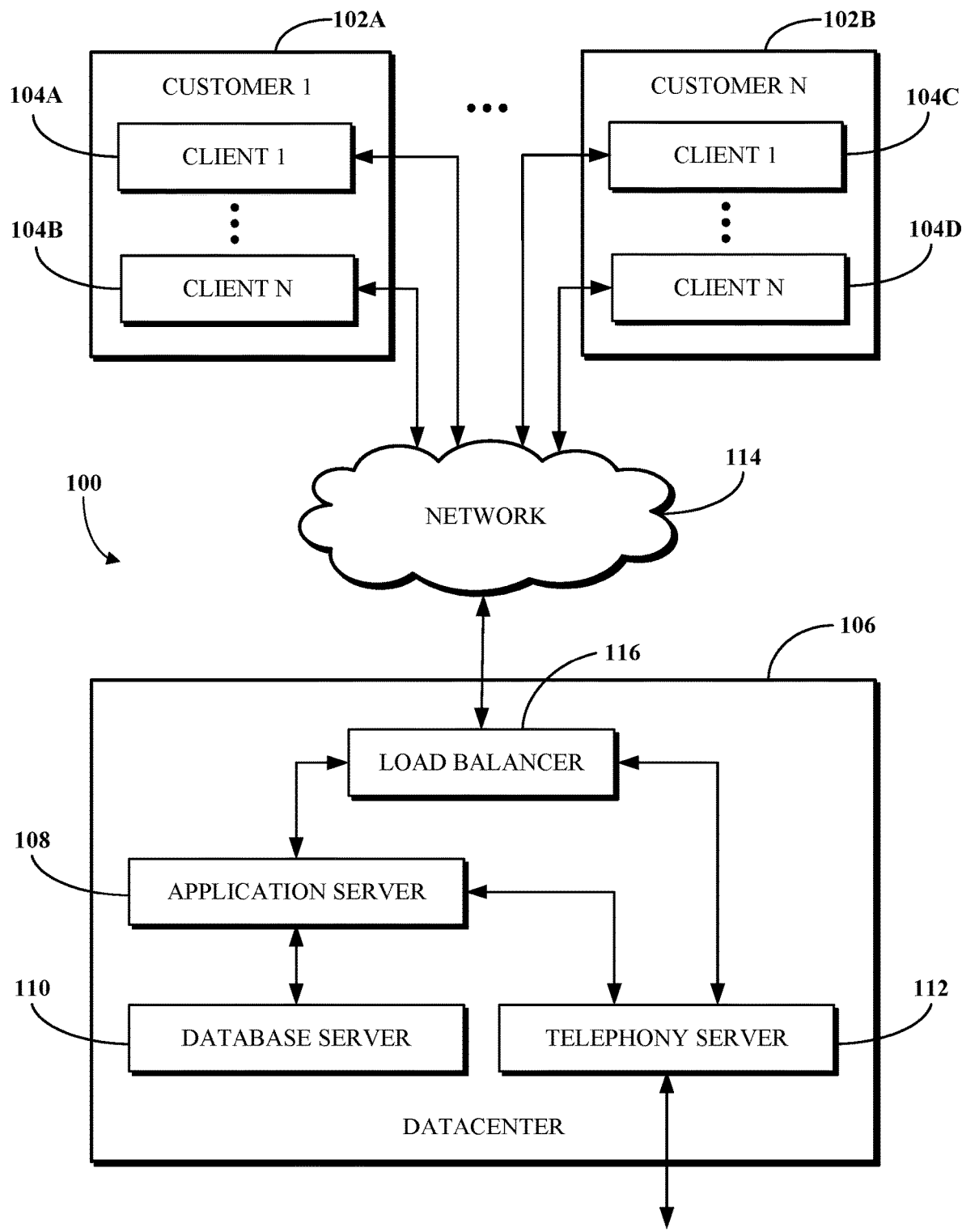
FIG. 1 is a block diagram of an example of an electronic computing and communications system.

A contact center may be operated by or otherwise on behalf of a business to assist users of various products and related services of the business. The contact center may be accessible to such users via multiple modalities, for example, telephone, text messaging, chat messaging, audio or video conferencing, social media, and/or email. For example, the contact center may be implemented via one or more software services of a Unified Communication as a Service (UCaaS) software platform. In recent years, many contact center systems have begun to use automated chat bots (e.g., computer-implemented engines configured to automatically evaluate input into a chat service) to process spoken or written natural language input provided by users, also referred to as queries or natural language queries, to identify the users' goals and to provide appropriate responses.

As used herein, a "query" or a "natural language query" may include a query spoken or written in a natural language. A natural language is a language used for communication by people, for example, English or Spanish. In some cases, a natural language query, whether presented by a contact center user in the form of audio or text-based input, may be matched to an intent known to the contact center system. An intent is a representation of a goal of a user in interacting with a contact center. For example, an intent may include a classification of a group of queries that are to be processed using a similar technique. For example, one or both of the queries "I moved and have a new address" or "I have a new billing address" may be matched to the intent "change billing address." The intent to which the query is matched then corresponds to a workflow that is carried out by the contact center system. For example, the workflow for the intent "change billing address" may include asking the user to enter the new billing address, confirming that the new billing address is a valid address, and providing a confirmation to the user. As a result of accurately matching queries to intents, query processing may be streamlined within a contact center system.

In some cases, a business that uses a contact center may be associated with hundreds or thousands of intents to which queries could be matched. These intents may include intents that are common to all or most businesses (e.g., "change billing address" or "change payment method"), intents that are common to businesses within an industry (e.g., the intent "track package" may be common to all businesses in the shipping industry), and business-specific intents that apply to a single business (e.g., the intent "change player color" may be relevant to a specific gaming company but not other businesses). The intents that are common to all or most businesses and the intents that are common to businesses within an industry may be determined by an employee of the contact center who is has knowledge of the industry and typical contact center usage. The business-specific intents may, for example, be determined manually such as by an employee of the business or automatically such as based on review headers and/or menu items on a webpage or other document associated with the business.

Each intent for the business may be associated with a workflow that is performed when a query is matched to the intent. The workflow may include a set of prompts for the user and automated responses to input received from the user in response to the prompts, a link to a webpage describing how the user can perform tasks associated with the intent, and/or connection with a human agent. For example, a workflow for the intent "purchase product" may include prompting the user to identify the product, displaying the price of the product, prompting the user to enter payment and shipping information, and providing an order confirmation to the user.

One technical challenge with matching queries to intents is that, when there are hundreds or thousands of intents, determining whether an input query matches or does not match to each intent may require a large amount of computing resources (e.g., processing hardware and/or memory) or time to execute artificial intelligence or other algorithms. This is, in particular, because conventional approaches leverage a centralized approach to intent matching functionality in which the various computing resources are not deployed for processing specific intents or types of intents. This technical challenge may thus result in significant latencies being introduced within a contact center engagement. Techniques for managing or optimizing the computing resource usage for matching a query to a subset of a set of multiple intents may be desirable in order to allow a contact center (or an operator thereof) to match a query to an intent in real time.

Implementations of this disclosure address problems such as these using distributed computing for intent matching. A query processing engine at a contact center server receives a text or audio query from a user device (e.g., in response to a prompt to a user of the user device to specify why they are accessing the contact center), for example, at an outset of an engagement between a user of the user device and the contact center. The query processing engine transmits the received query to multiple deployment engines, where each deployment engine is associated with an intent and determines whether the query matches to the intent. (In some cases, each deployment engine is associated with a unique intent. For example, a first deployment engine is associated with the intent "purchase product," a second deployment engine is associated with the intent "return product," and a third deployment engine is associated with the intent "change billing address.") A controller engine assigns computing resources (e.g., processing hardware, memory, network resources, and/or server) to the deployment engines based on resource requests of the deployment engines. Each of the deployment engines determines whether the query matches to its associated intents and transmit, to the query processing engine, a score representing a likelihood (e.g., a probability) that the query matches to the intent. The query processing engine aggregates the intents for which the likelihood falls within a range (e.g., greater than 50%) and transmits, to the user device, an audio or text message indicating the aggregated intents and prompting the user to identify one of those aggregated intents which correctly addresses their query. The range may be a predefined range (e.g., greater than 40%) or may be dynamically defined, for example, to include at most n intents or the n intents with the highest scores, where n is a preset positive integer. In some cases, the range is defined to include the n intents with the highest score if there are n or more intents exceeding a preset score or all intents exceeding the preset score if there are fewer than n such intents. The user selects, via the user device, the correct intent and the user device transmits the selected intent to the contact center server. The contact center server then performs a workflow corresponding to the selected intent to further process the engagement between the user of the user device and the contact center.

As used herein, the term "intent" may include a member of a set of stored intents, where multiple natural language queries may match to the same intent. The intent may correspond to predicted data, for example, a predicted goal, of a user entering the natural language query. The predicted data may be associated with the natural language query. For example, a credit card company may have intents including: "change billing address," "dispute a charge," "request credit limit increase," and "request interest rate reduction," each of which could have multiple different corresponding natural language queries.

As used herein, the phrase "natural language" may include any spoken or written language that has developed and evolved naturally by human use thereof. Examples of natural languages include English, Spanish, French, German, Greek, Chinese, Japanese, and Korean.

As used herein, the phrase "engine" may include software, hardware, or a combination of software and hardware to perform a set of operations. An engine may be implemented in software and may reside in the cloud, and may be assigned hardware resources from a pool of hardware resources on an ad hoc basis based on the engine's requirements when the engine is being executed. Alternatively, an engine may be hard-wired into a processor of a special purpose computer. In another example, an engine is implemented in software on a general purpose computer.

To describe some implementations in greater detail, reference is first made to examples of hardware and software structures used to implement intent matching. FIG. 1 is a block diagram of an example of an electronic computing and communications system 100, which can be or include a distributed computing system (e.g., a client-server computing system), a cloud computing system, a clustered computing system, or the like.

The system 100 includes one or more customers, such as customers 102A through 102B, which may each be a public entity, private entity, or another corporate entity or individual that purchases or otherwise uses software services, such as of a UCaaS platform provider. Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include a number of customers and/or clients or can have a configuration of customers or clients different from that generally illustrated in FIG. 1. For example, and without limitation, the system 100 can include hundreds or thousands of customers, and at least some of the customers can include or be associated with a number of clients.

The system 100 includes a datacenter 106, which may include one or more servers. The datacenter 106 can represent a geographic location, which can include a facility, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers. In some implementations, the datacenter 106 can be associated or communicate with one or more datacenter networks or domains, which can include domains other than the customer domains for the customers 102A through 102B.

The datacenter 106 includes servers used for implementing software services of a UCaaS platform. The datacenter 106 as generally illustrated includes an application server 108, a database server 110, and a telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106. The UCaaS platform uses a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform, including conferencing software, messaging software, and/or other intra-party or inter-party communications software. The application server 108 may, for example, be or include a unitary Java Virtual Machine (JVM).

In some implementations, the application server 108 can include an application node, which can be a process executed on the application server 108. For example, and without limitation, the application node can be executed in order to deliver software services to a client, such as one of the clients 104A through 104D, as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, the client 104 or the application server 108.

The telephony server 112 enables network-based telephony and web communications from and to clients of a customer, such as the clients 104A through 104B for the customer 102A or the clients 104C through 104D for the customer 102B. Some or all of the clients 104A through 104D may be voice over internet protocol (VOIP)-enabled devices configured to send and receive calls over a network 114. In particular, the telephony server 112 includes a session initiation protocol (SIP) zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based private branch exchange (PBX) system.

The SIP zone receives telephony traffic from a client of a customer and directs same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phone which is not configured for VOIP communication) which is not VOIP-enabled, the telephony server 112 may initiate a SIP transaction via a VOIP gateway that transmits the SIP signal to a public switched telephone network (PSTN) system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, a SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other end at a computing aspect of the customer environment. In yet another example, carrier peering may be enabled to leverage a connection of a peered carrier to the telephony server 112.

In some such implementations, a SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106.

For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106. In some implementations, the load balancer 116 can be omitted.

Figure 2:
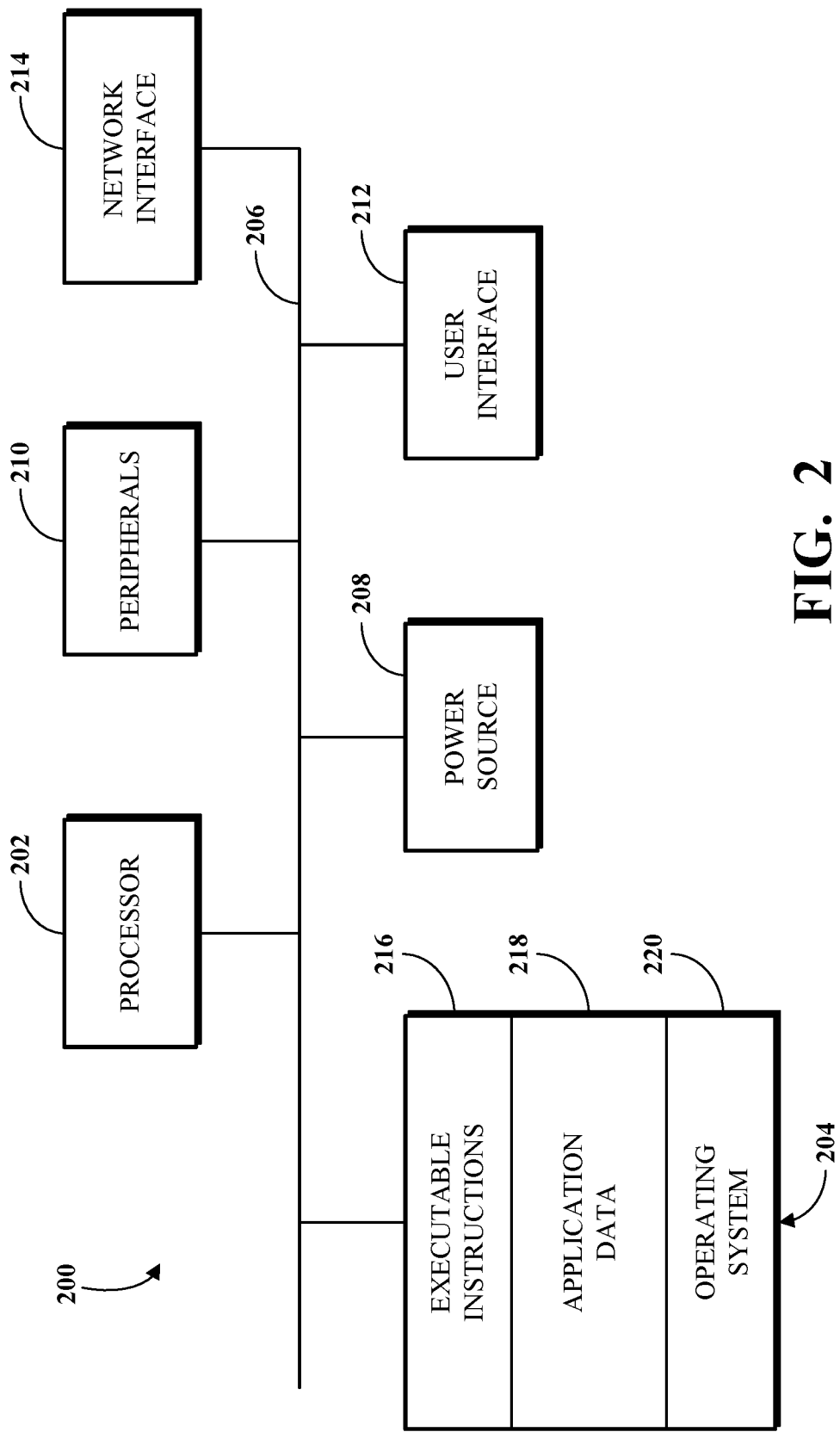
FIG. 2 is a block diagram of an example internal configuration of a computing device of an electronic computing and communications system.

FIG. 2 is a block diagram of an example internal configuration of a computing device 200 of an electronic computing and communications system. In one configuration, the computing device 200 may implement one or more of the client 104, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, configured for manipulating or processing information. For example, the processor 202 can include multiple processors interconnected in one or more manners, including hardwired or networked. The operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory can be random access memory (RAM) (e.g., a DRAM module, such as DDR SDRAM). In another example, the non-volatile memory of the memory 204 can be a disk drive, a solid state drive, flash memory, or phase-change memory. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®; an operating system for a mobile device, such as a smartphone or tablet device; or an operating system for a non-mobile device, such as a mainframe computer.

The power source 208 provides power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802.X protocol (e.g., Wi-Fi, Bluetooth, or ZigBee), infrared, visible light, general packet radio service (GPRS), global system for mobile communications (GSM), code-division multiple access (CDMA), Z-Wave, another protocol, or a combination thereof.

Figure 3:
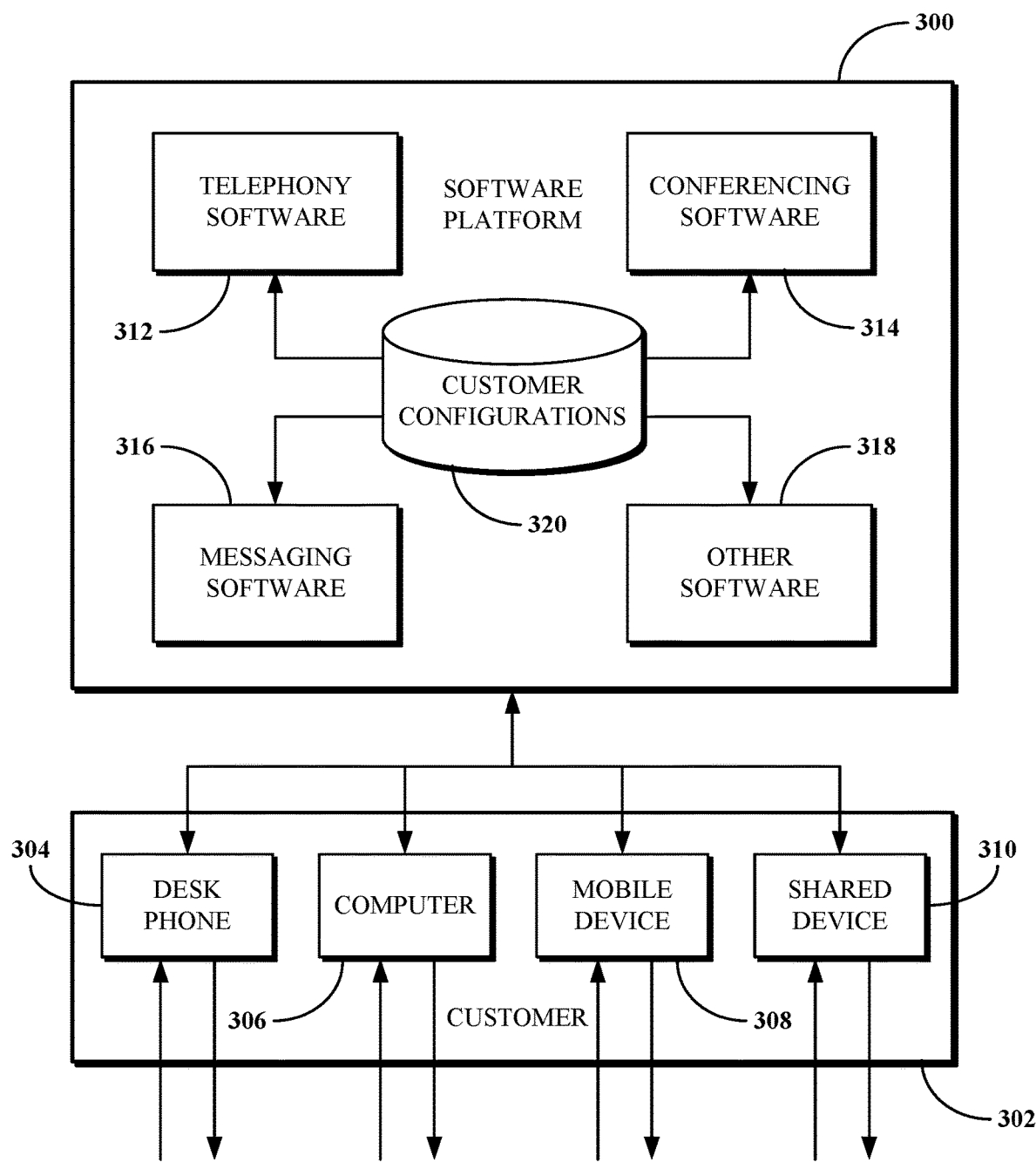
FIG. 3 is a block diagram of an example of a software platform implemented by an electronic computing and communications system.

FIG. 3 is a block diagram of an example of a software platform 300 implemented by an electronic computing and communications system, for example, the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. The software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302 as shown includes four clients—a desk phone 304, a computer 306, a mobile device 308, and a shared device 310. The desk phone 304 is a desktop unit configured to at least send and receive calls and includes an input device for receiving a telephone number or extension to dial to and an output device for outputting audio and/or video for a call in progress. The computer 306 is a desktop, laptop, or tablet computer including an input device for receiving some form of user input and an output device for outputting information in an audio and/or visual format. The mobile device 308 is a smartphone, wearable device, or other mobile computing aspect including an input device for receiving some form of user input and an output device for outputting information in an audio and/or visual format. The desk phone 304, the computer 306, and the mobile device 308 may generally be considered personal devices configured for use by a single user. The shared device 310 is a desk phone, a computer, a mobile device, or a different device which may instead be configured for use by multiple specified or unspecified users.

Each of the clients 304 through 310 includes or runs on a computing device configured to access at least a portion of the software platform 300. In some implementations, the customer 302 may include additional clients not shown. For example, the customer 302 may include multiple clients of one or more client types (e.g., multiple desk phones or multiple computers) and/or one or more clients of a client type not shown in FIG. 3 (e.g., wearable devices or televisions other than as shared devices). For example, the customer 302 may have tens or hundreds of desk phones, computers, mobile devices, and/or shared devices.

The software services of the software platform 300 generally relate to communications tools, but are in no way limited in scope. As shown, the software services of the software platform 300 include telephony software 312, conferencing software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the clients 304 through 310 and other telephony-enabled devices, which may be other ones of the clients 304 through 310, other VOIP-enabled clients of the customer 302, non-VOIP-enabled devices of the customer 302, VOIP-enabled clients of another customer, non-VOIP-enabled devices of another customer, or other VOIP-enabled clients or non-VOIP-enabled devices. Calls sent or received using the telephony software 312 may, for example, be sent or received using the desk phone 304, a softphone running on the computer 306, a mobile application running on the mobile device 308, or using the shared device 310 that includes telephony features.

The telephony software 312 further enables phones that do not include a client application to connect to other software services of the software platform 300. For example, the telephony software 312 may receive and process calls from phones not associated with the customer 302 to route that telephony traffic to one or more of the conferencing software 314, the messaging software 316, or the other software 318.

The conferencing software 314 enables audio, video, and/or other forms of conferences between multiple participants, such as to facilitate a conference between those participants. In some cases, the participants may all be physically present within a single location, for example, a conference room, in which the conferencing software 314 may facilitate a conference between only those participants and using one or more clients within the conference room. In some cases, one or more participants may be physically present within a single location and one or more other participants may be remote, in which the conferencing software 314 may facilitate a conference between all of those participants using one or more clients within the conference room and one or more remote clients. In some cases, the participants may all be remote, in which the conferencing software 314 may facilitate a conference between the participants using different clients for the participants. The conferencing software 314 can include functionality for hosting, presenting scheduling, joining, or otherwise participating in a conference. The conferencing software 314 may further include functionality for recording some or all of a conference and/or documenting a transcript for the conference.

The messaging software 316 enables instant messaging, unified messaging, and other types of messaging communications between multiple devices, such as to facilitate a chat or other virtual conversation between users of those devices. The unified messaging functionality of the messaging software 316 may, for example, refer to email messaging which includes a voicemail transcription service delivered in email format.

The other software 318 enables other functionality of the software platform 300. Examples of the other software 318 include, but are not limited to, device management software, resource provisioning and deployment software, administrative software, third party integration software, and the like. In one particular example, the other software 318 can include software of an intent matching engine and/or a query processing engine.

The software 312 through 318 may be implemented using one or more servers, for example, of a datacenter such as the datacenter 106 shown in FIG. 1. For example, one or more of the software 312 through 318 may be implemented using an application server, a database server, and/or a telephony server, such as the servers 108 through 112 shown in FIG. 1. In another example, one or more of the software 312 through 318 may be implemented using servers not shown in FIG. 1, for example, a meeting server, a web server, or another server. In yet another example, one or more of the software 312 through 318 may be implemented using one or more of the servers 108 through 112 and one or more other servers. The software 312 through 318 may be implemented by different servers or by the same server.

Features of the software services of the software platform 300 may be integrated with one another to provide a unified experience for users. For example, the messaging software 316 may include a user interface element configured to initiate a call with another user of the customer 302. In another example, the telephony software 312 may include functionality for elevating a telephone call to a conference. In yet another example, the conferencing software 314 may include functionality for sending and receiving instant messages between participants and/or other users of the customer 302. In yet another example, the conferencing software 314 may include functionality for file sharing between participants and/or other users of the customer 302. In some implementations, some or all of the software 312 through 318 may be combined into a single software application run on clients of the customer, such as one or more of the clients 304 through 310.

Figure 4:
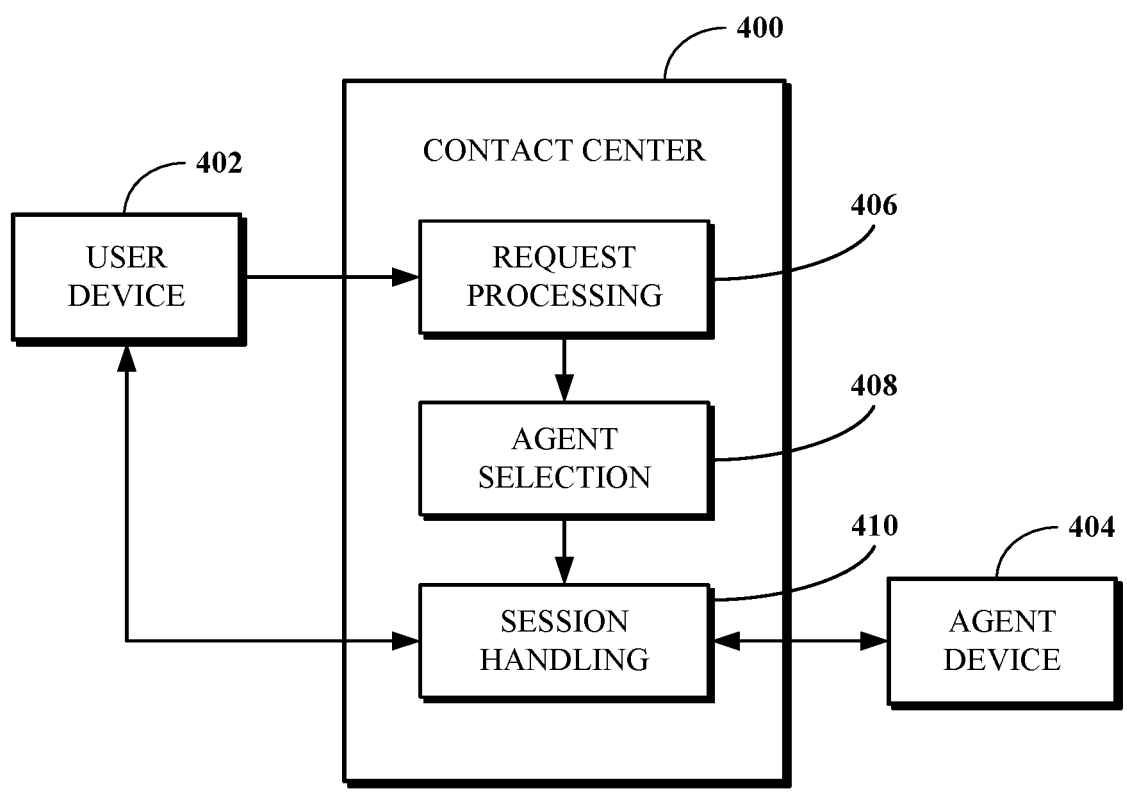
FIG. 4 is a block diagram of an example of a contact center system.

FIG. 4 is a block diagram of an example of a contact center system. A contact center 400, which in some cases may be implemented in connection with a software platform (e.g., the software platform 300 shown in FIG. 3), is accessed by a user device 402 and used to establish a connection between the user device 402 and an agent device 404 over one of multiple modalities available for use with the contact center 400, for example, telephony, video, text messaging, chat, and social media. The contact center 400 is implemented using one or more servers and software running thereon. For example, the contact center 400 may be implemented using one or more of the servers 108 through 112 shown in FIG. 1, and may use communication software such as or similar to the software 312 through 318 shown in FIG. 3. The contact center 400 includes software for facilitating contact center engagements requested by user devices such as the user device 402. As shown, the software includes request processing software 406, agent selection software 408, and session handling software 410.

The request processing software 406 processes a request for a contact center engagement initiated by the user device 402 to determine information associated with the request. The request may include a natural language query or a request entered in another manner (e.g., "press 1 to pay a bill, press 2 to request service"). The information associated with the request generally includes information identifying the purpose of the request and which is usable to direct the request traffic to a contact center agent capable of addressing the request. The information associated with the request may include information obtained from a user of the user device 402 after the request is initiated. For example, for the telephony modality, the request processing software 406 may use an interactive voice response (IVR) menu to prompt the user of the user device to present information associated with the purpose of the request, such as by identifying a category or sub-category of support requested. In another example, for the video modality, the request processing software 406 may use a form or other interactive user interface to prompt a user of the user device 402 to select options which correspond to the purpose of the request. In yet another example, for the chat modality, the request processing software 406 may ask the user of the user device 402 to summarize the purpose of the request (e.g., the natural language query) via text and thereafter process the text entered by the user device 402 using natural language processing and/or other processing.

The session handling software 410 establishes a connection between the user device 402 and the agent device 404, which is the device of the agent selected by the agent selection software 408. The particular manner of the connection and the process for establishing same may be based on the modality used for the contact center engagement requested by the user device 402. The contact center engagement is then facilitated over the established connection. For example, facilitating the contact center engagement over the established connection can include enabling the user of the user device 402 and the selected agent associated with the agent device 404 to engage in a discussion over the subject modality to address the purpose of the request from the user device 402. The facilitation of the contact center engagement over the established connection can use communication software implemented in connection with a software platform, for example, one of the software 312 through 318, or like software.

The user device 402 is a device configured to initiate a request for a contact center engagement which may be obtained and processed using the request processing software 406. In some cases, the user device 402 may be a client device, for example, one of the clients 304 through 310 shown in FIG. 3. For example, the user device 402 may use a client application running thereat to initiate the request for the contact center engagement. In another example, the connection between the user device 402 and the agent device 404 may be established using software available to a client application running at the user device 402. Alternatively, in some cases, the user device 402 may be other than a client device.

The agent device 404 is a device configured for use by a contact center agent. Where the contact center agent is a human, the agent device 404 is a device having a user interface. In some such cases, the agent device 404 may be a client device, for example, one of the clients 304 through 310, or a non-client device. In some such cases, the agent device 404 may be a server which implements software usable by one or more contact center agents to address contact center engagements requested by contact center users. Where the contact center agent is a non-human, the agent device 404 is a device that may or may not have a user interface. For example, in some such cases, the agent device 404 may be a server which implements software of or otherwise usable in connection with the contact center 400.

Although the request processing software 406, the agent selection software 408, and the session handling software 410 are shown as separate software components, in some implementations, some or all of the request processing software 406, the agent selection software 408, and the session handling software 410 may be combined. For example, the contact center 400 may be or include a single software component which performs the functionality of all of the request processing software 406, the agent selection software 408, and the session handling software 410. In some implementations, one or more of the request processing software 406, the agent selection software 408, or the session handling software 410 may be comprised of multiple software components. In some implementations, the contact center 400 may include software components other than the request processing software 406, the agent selection software 408, and the session handling software 410, such as in addition to or in place of one or more of the request processing software 406, the agent selection software 408, and the session handling software 410.

Figure 5:
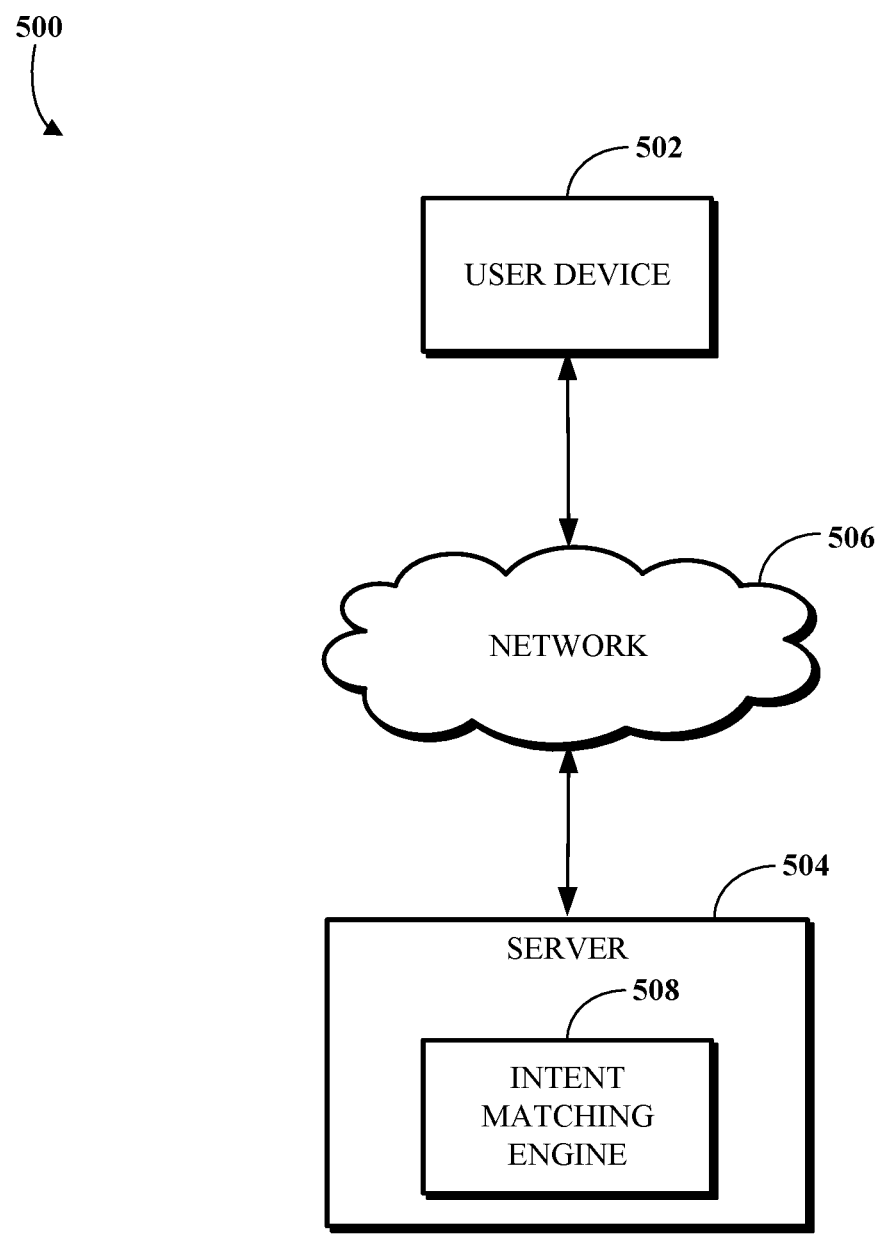
FIG. 5 is a block diagram of an example of a system for intent matching.

FIG. 5 is a block diagram of an example of a system 500 for intent matching. As shown, the system 500 includes a user device 502 and a server 504 capable of communicating over a network 506. The server 504 stores an intent matching engine 508 that matches an input natural language query to an intent. The intent matching engine 508 may be implemented using machine learning or other artificial intelligence technologies. In some examples, the intent matching engine 508 leverages one or multiple convolutional neural networks (CNNs) that are capable of online learning. (Using online learning, the CNNs may be trained during its real world usage, based on intents suggested, by the CNNs, for queries and whether or not the user accepted the intent.) Alternatively, any other type of artificial neural network (ANN) may be used in place of one or more of the CNNs. In some cases, the intent matching engine may be implemented using at least one of a classification model, a regression model, clustering, dimensionality reduction, or deep learning. More details of the operation of the intent matching engine are provided below. As used herein, an engine may include software, hardware, or a combination of software and hardware.

The user device 502 may correspond to the user device 402 and/or to one of the clients 104A-D. The server 504 may correspond to a server of the contact center 400 and/or to the application server 108.

According to some implementations, the user device 502 transmits a natural language query (i.e., a query in one of multiple natural languages, such as English, Spanish, French, German, Chinese, or Japanese) to the server 504 over the network 506. The natural language query may be spoken, typed, or otherwise inputted into the user device 502 in a natural language (e.g., of the multiple natural languages). The natural language query may include a question or a request provided to a chat bot, for example, "How do I cancel my subscription?" or "I would like to cancel my subscription."

In response to receipt of the query from the user device 502, the server 504 uses the intent matching engine 510 to match the query to an intent, and transmits, to the user device 502, an output associated with the intent. An intent may represent a goal or a purpose that a user of the user device 502 is attempting to accomplish. For example, the query, "I would like to cancel my subscription," may match to the intent "cancel subscription."

Figure 6:
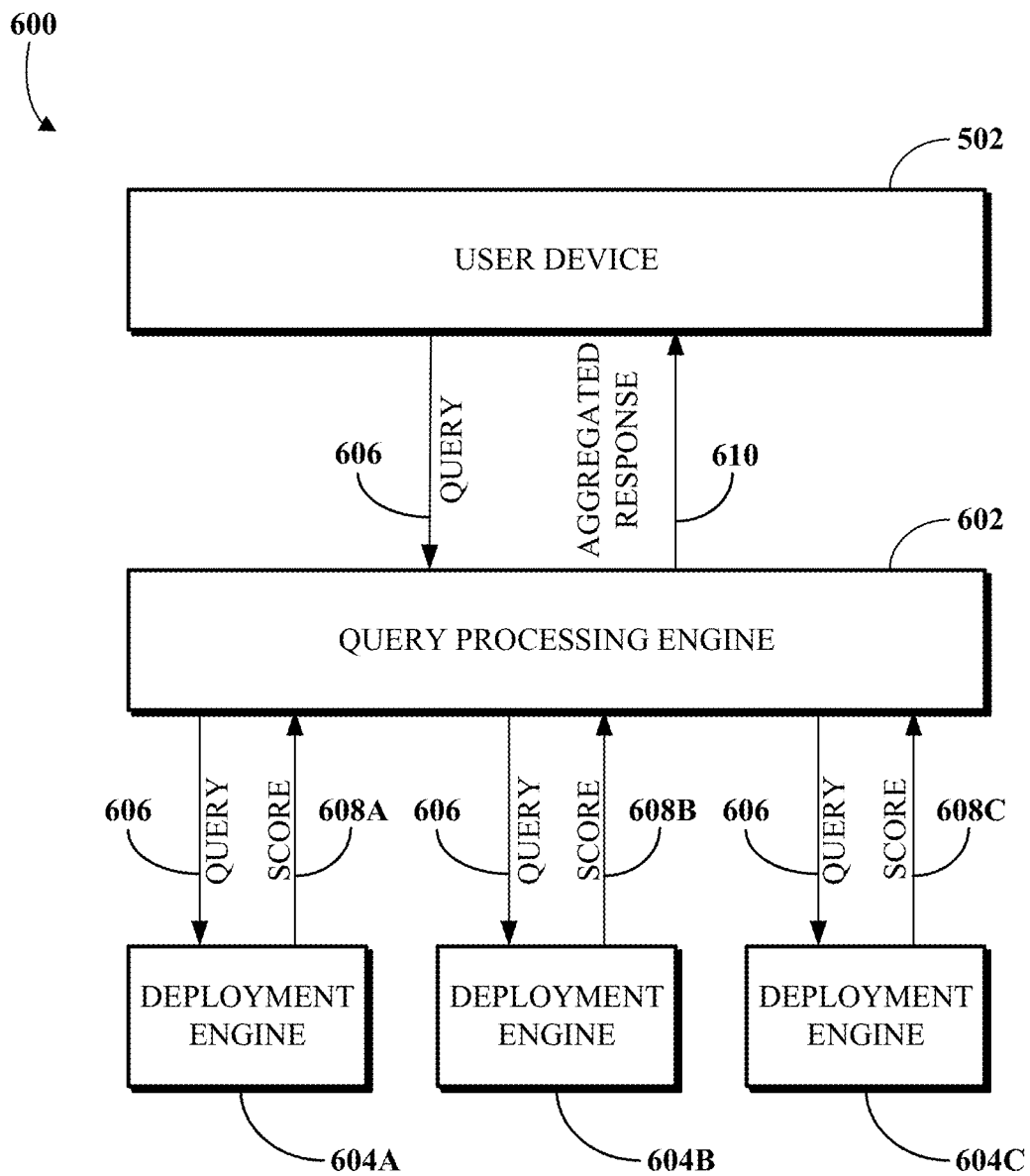
FIG. 6 is a block diagram of an example of a system for intent matching that leverages distributed computing.

FIG. 6 is a block diagram of an example of a system 600 for intent matching that leverages distributed computing. As shown, the system 600 includes the user device 502, a query processing engine 602, and deployment engines 604A-C. While three deployment engines 604A-C are illustrated, the disclosed technology may be implemented with other numbers (e.g., hundreds or thousands) of deployment engines. The query processing engine 602 and/or the deployment engines 604A-C may reside at the server 504 (e.g., as a component of the intent matching engine 508) or at other machines connected to the server 504. In some cases, the server 504 may include multiple machines that perform the functions of the query processing engine 604 and/or the deployment engines 604A-C. In some cases, the deployment engines 604A-C reside in the cloud and are dynamically assigned resources based on their usage of resources, for example, as described in conjunction with FIG. 8.

As illustrated, the user device 502 transmits a query 606 to the query processing engine 602. The query 606 may be generated during an engagement between the user device 502 and a contact center using the query processing engine 602, such as in response to a prompt for the user of the user device 502 to specify why they are accessing the contact center and may include text, an audio recording, and/or a video recording. The query 606 may, for example, be a natural language query. The query may be generated at the user device 502 by a user typing or generating an audio recording or a video recording at the user device. Generating a query may include generating the typed text, the audio recording, and/or the video recording. The user's affirmative consent is obtained (e.g., by playing an audio recording or providing an on-screen notification) prior to recording the user and/or at least temporarily storing the text generated by the user for processing as described herein.

Upon receiving the query 606, the query processing engine 602 forwards the query 606 to each deployment engine 604A-C from a set of deployment engines. The deployment engines 604A-C to which the query 606 is forwarded may include all deployment engines associated with the entity (e.g., a business or an organization) that the user is contacting via the contact center service. The deployment engines 604A-C may include global deployment engines for all entities and entity-specific deployment engines for the specific entity that is being contacted. The global deployment engines may be for intents that could apply to many different entities (e.g., change payment card) and may be developed by the contact center service. The entity-specific deployment engines may be for intents that are specific to the entity being contacted and may be developed by that entity. The deployment engines 604A-C may reside at the same server as the query processing engine 602 or at different servers. In some cases, the query 606 may be modified or preprocessed prior to forwarding. For example, speech-to-text techniques may be used to convert the query 606 from audio into text. If the query 606 is in one of multiple natural languages (e.g., in English, Spanish, French, or Japanese), the query may be translated into a default natural language (e.g., English) or converted into a common format for representing natural language content. The common format may be a numeric or vector-based format where numbers correspond to the meanings of the words.

To expedite processing of the query 606, the query may be provided to the multiple deployment engines 604A-C in parallel. The deployment engines 604A-C may then process the query 606 in parallel with one another. Alternatively, two or more of the deployment engines 604A-C may operate in series.

Each deployment engine 604A-C is associated with an intent and determines (e.g., using artificial intelligence or statistical techniques) whether the query 606 matches to the intent. For instance, the deployment engine 604A may correspond to the intent "close account," and may determine whether the query 606 corresponds to the intent "close account" based on the text, audio recording, or video recording of the query 606. The deployment engine 604A transmits, to the query processing engine 602, a score 608A representing a probability or a likelihood that the query 606 matches to its associated intent (e.g., "close account"). The score 608A may be a Boolean score (e.g., TRUE if the query 606 matches to the associated intent, FALSE otherwise).

Alternatively, the score 608A represent the probability that the query 606 matches to the associated intent as a real number between 0 and 1 or as an integer between 0 and 100 (e.g., representing the percentage probability). Other techniques for representing probability or likelihood (e.g., odds ratio or log odds ratio) may also be used. Similarly, the deployment engine 604B transmits, to the query processing engine 602, a score 608B representing a probability or a likelihood that the query 606 matches its associated intent. The deployment engine 604C transmits, to the query processing engine 602, a score 608C representing a probability or a likelihood that the query 606 matches its associated intent.

Each deployment engine 604A-C may reside in the cloud and may be assigned computing resources on an ad hoc basis such that limited computing resources may be used most effectively. In some cases, a controller engine (e.g., a Kubernetes controller engine) assigns computing resources to the deployment engines 604A-C based on demand for the computing resources at each deployment engine 604A-C and availability of the computing resources. Operations of the controller engine are described in greater detail in conjunction with FIG. 8.

The deployment engines 604A-C may include deployment engines associated with global intents (e.g., intents that apply to all entities using the contact center service, e.g., change payment account), industry-specific intents (e.g., intents that apply to all entities in a specific industry, e.g., track package for the shipping industry), and entity-specific intents that are specific for a given entity. The global intents may be identified manually by an employee of the contact center service. The industry specific intents may be identified by a person who is familiar with the industry. That person may be employed by the contact center service. The entity-specific intents may be obtained manually from the entity and/or automatically based on headers on the entity's website or other literature describing the goods or services offered by the entity. Each deployment engine 604A-C may be implemented using an ANN or, alternatively, using other artificial intelligence, statistical techniques, or rule-based techniques. The ANN or other artificial intelligence or technique may be trained based on queries that are labeled (e.g., manually by a human operator) as either corresponding to the intent of the deployment engine 604A-C or not corresponding to that intent. Alternatively, in a rule-based implementation, rules (e.g., written by humans) may be applied to queries and each query may be matched (or not matched) to the intent based on the rules. For example, a query may be matched to the intent "change address," if it has the spoken or written word "address" in it.

In some examples, the deployment engine 604A computes the score 608A for the whether the query 606 matches to the intent of the deployment engine 606A using an ANN. The input to the ANN is the text, audio or video of the query 606 and the output of the ANN is the score representing the likelihood that the query 606 matches to the intent. For example, the score may be a probability. The ANN may leverage a feature vector that includes the text of the query or features (e.g., words being spoken or voice tonality) of the audio or video recording of the query. Alternatively, other statistical or rule-based techniques may be used in addition to or in place of the ANN. For example, if the intent is "change address" and the text "change address" appears in the query, the score may always be set to 100%. The deployment engines 604B-C may operate similarly to the deployment engine 604A.

The query processing engine 602 receives the scores 608A-C from the deployment engines 604A-C, respectively, and identifies a subset of the scores 608A-C that are within a predefined or dynamic range. If the range is predefined, it may be predefined during programming of the query processing engine 602 in the software of the query processing engine 602. For example, if the scores 608A-C represent a probability that the query matches to the intent of the associated deployment engine 604A-C, the range may be the probability (or score) exceeding 0.5 and being below or equal to 1. (As used herein, the term "range" may include a range having an upper bound and a lower bound (e.g., between 30% and 60%) a range having only an upper bound (e.g., below 60%) or a range having only a lower bound (e.g., above 30%).) The query processing engine 602 generates an aggregated response 610 that aggregates representations of the intents associated with the scores that are within the predefined or dynamic range, and forwards the aggregated response 610 to the user device 502. At the user device 502, the user selects the intent that is applicable to the user from the intents in the aggregated response 610. For example, if the user device 502 is a telephone accessing the contact center via the PSTN, the user may be asked to press a button on the telephone corresponding to the correct intent (e.g., "Press 1 to close your account or press 2 to cancel your subscription"). Alternatively, if the user device 502 is a laptop computer accessing the contact center via a webpage, the intents may be represented via hyperlinks to webpages that handle the intents or describe how the user can handle the intent themselves (e.g., a first hyperlink to a webpage describing how to close an account and a second hyperlink which, when selected, instructs the contact center to automatically cancel the subscription of the user).

Figure 7:
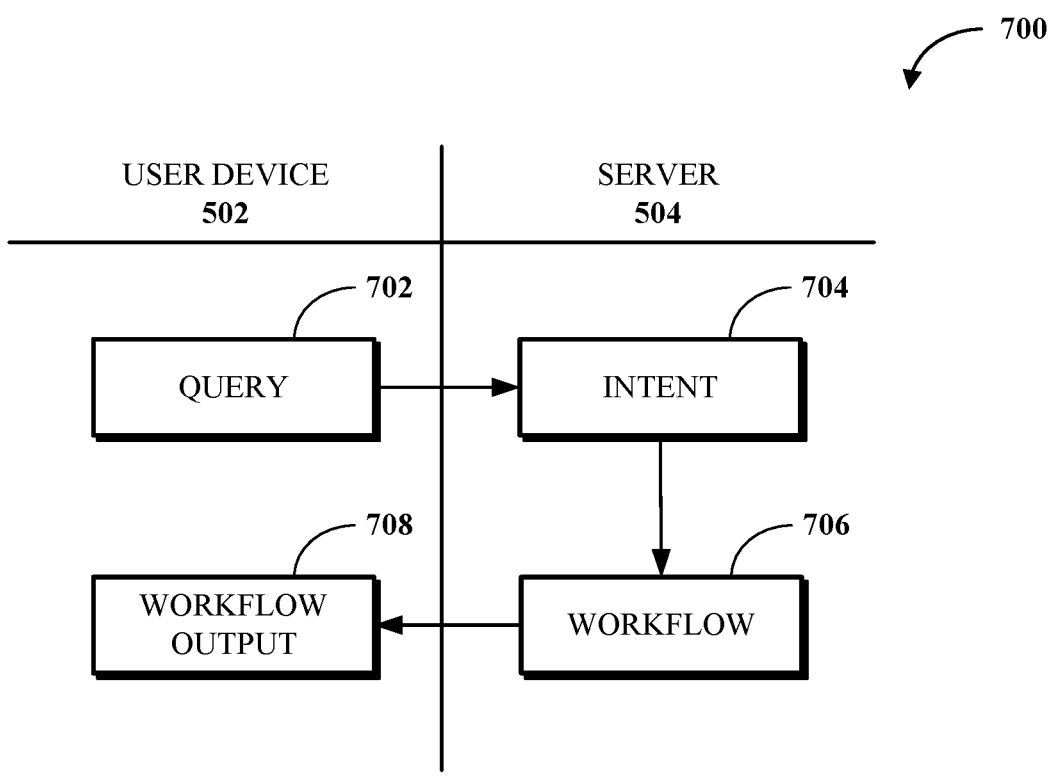
FIG. 7 is a data flow diagram of an example of intent matching and workflow processing.

FIG. 7 is a data flow diagram of an example of intent matching and workflow processing 700. As shown, the intent matching and workflow processing 700 is implemented using the user device 502 and the server 504 described in conjunction with FIG. 5.

As shown in FIG. 7, the user device 502 generates a query 702 in a natural language and transmits the query 702 to the server 504. The query 702 may be generated during a communication with a chat bot of the server 504 via a telephone call, a messaging application, a website, or a dedicated application of an entity associated with the chat bot. For example, a user might wish to open a savings account at a bank. To accomplish this, the user might telephone the bank and may be asked, by a chat bot, "Please state the reason for your call." In response, the user might say, "I want to open a new savings account," and that phrase may become the query.

The server 504 matches the query 702 to an intent 704 using the intent matching engine 508 shown in FIG. 5 or using the query processing engine 602 and the deployment engine 604A-C of FIG. 6. The intent matching engine 508 may include the query processing engine 608 and some or all of the deployment engines 604A-C. The intent 704 may be identified by applying a CNN (e.g., from one or more of the deployment engines 604A-C) or other artificial intelligence software of the intent matching engine 508 to the query 702. For example, the query 702 "I want to open a new savings account," may match to the intent "open account." The server 504 identifies a workflow 706 corresponding to the intent 704. The workflow 706 may include, for example, a link to a webpage for opening new accounts with the bank or connection with a human representative who can assist the user of the user device 502 with opening the new account. In some cases, the workflow 706 may be performed by the chat bot of the server 504 directly. For example, to open the new account, the workflow 706 may include the chat bot verifying the user's identity (e.g., by having the user provide their social security number and answer security questions generated based on their credit report), verifying the type of account (e.g., savings account) that the user wishes to open, requesting the account number of another account from which the opening deposit is to be obtained, and initiating an automated clearing house (ACH) request for the opening deposit. The server 504 transmits a workflow output 708 associated with the workflow 706 (e.g., questions by the chat bot, the link to the webpage, or the connection with the human representative) to the user device 502.

Figure 8:
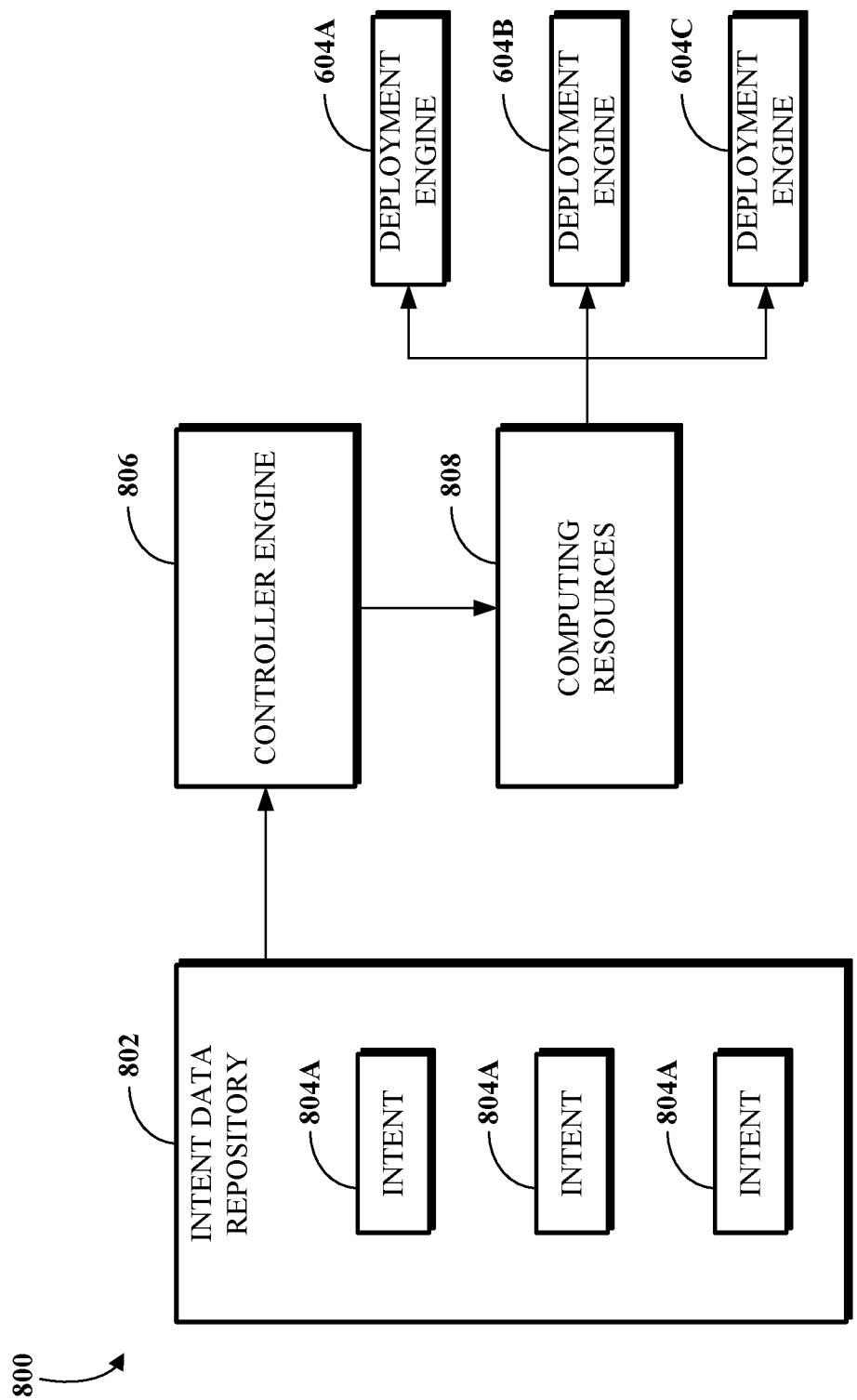
FIG. 8 is a block diagram of an example of a system for assigning computing resources to deployment engines for intent matching.

FIG. 8 is a block diagram of an example of a system 800 for assigning computing resources to deployment engines for intent matching. As shown, the system 800 includes an intent data repository 802 that stores intents 804A-C. While three intents 804A-C are illustrated, the disclosed technology may be implemented with other numbers of intents. One of the intents 804A-C may correspond to the intent 704.

The system 800 also includes a controller engine 806, computing resources 808, and the deployment engines 604A-C. The deployment engine 604A corresponds to the intent 804A, the deployment engine 604B corresponds to the intent 804B, and the deployment engine 604C corresponds to the intent 804C. The computing resources 808 may include any resources used for computing to which access may be limited (e.g., due to contention). For example, the computing resources 808 may include at least one of a server, a processor, memory, and a network resource.

The intent data repository 802 may be a database or another data storage unit. The intent data repository 802 stores a set of intents 804A-C for an entity (e.g., a business or an organization) that uses a contact center (e.g., the contact center 400). The intents 804A-C may be representations of goals with which users contact the contact center, with each intent 804A-C being processed according to a workflow (e.g., the workflow 706). The intents 804A-C in the intent data repository 802 may be added to the intent data repository 802 using a combination of manual techniques and automatic techniques. The manual techniques may include manual listing of the intents 804A-C for storage in the intent data repository 802. Alternatively, the intents may be automatically identified by reviewing (e.g., using a web parser) code of a webpage of the entity and identifying headers and/or menu items therein, with some of the intents 804A-C corresponding to the menu items.

The controller engine 806 controls access to computing resources 808 by assigning the computing resources 808 to the deployment engines 604A-C, while the deployment engines are computing whether the query matches to the associated intent 804A-C. The computing resources 808 may be assigned based on ad hoc requirements of the deployment engines 604A-C and based on optimizations (e.g., for computation speed) set by a programmer of the controller engine 806. The controller engine 806 may be a Kubernetes controller. In some cases, the controller engine 806 is a state-based controller that observes the states of the deployment engines 604A-C and assigns resources to the controller engines 604A-C based on their states. For example, if the deployment engine 604A requires additional processors but has more memory than it needs, and the deployment engine 604B requires additional memory but has more processors than it needs, then the controller engine 806 may transfer processors from the deployment engine 604B to the deployment engine 604A and may transfer memory from the deployment engine 604A to the deployment engine 604B. In some implementations, the controller engine 806 observes computing resource usage of the deployment engines 604A-C, determines that operation of a first one of the deployment engines 604A-C is bottlenecked due to lack of a first computing resource (e.g., processors or memory), determines that a second one of the deployment engines 604A-C has excess capacity of the first computing resource, and transfers some of the first computing resource from the second one of the deployment engines 604A-C to the first one of the deployment engines 604A-C.

In some cases, the computing resources 808 are divided into computing nodes. Each computing node is a physical node which includes at least a processor and a memory that can be assigned, by the controller engine 806, to one of the deployment engines 604A-C as a discrete block. The controller engine 806 assigns one or more nodes to each deployment engine 604A-C while the deployment engine 604A-C is executing. During execution, the nodes may be dynamically reassigned, by the controller engine 806, from one deployment engine 604A-C to another, in response to demand for the computing resources 808 shifting among the deployment engines 604A-C. For example, initially the deployment engine 604A and the deployment engine 604B may require an identical number of nodes. Over time, the deployment engine 604A may require more nodes (e.g., to do more complex computations) and the deployment engine 604B may require fewer nodes (e.g., as it is doing less complex computations). In response, the controller engine 806 may reassign some nodes from the deployment engine 604B to the deployment engine 604A.

In one example use case, a user telephones a contact center of an online store with a subscription service and says, "I wish to close my account," in response to an automated prompt to specify a reason for the call. To simplify the example, the online store has three stored intents 804A-C in its intent data repository 802—close account, cancel subscription, and purchase product. (However, in some real-world cases, the online store may have hundreds or thousands of intents.) The query processing engine converts the phrase "I wish to close my account," from audio into text and stores this phrase as the query. The query is then transmitted to the deployment engines 604A-C for each intent—"close account," "cancel subscription," and "purchase product." Each deployment engine 604A-C then requests the computing resources 808 (e.g., processors or memory resources) from the controller engine 806 to compute (e.g., using an ANN, as described above) whether the query "I wish to close my account" corresponds to its intent. The controller engine 806 provides, to the deployment engines 604A-C, the computing resources 808 that the deployment engines 604A-C use to make the computations that are described herein, for example, in conjunction with FIG. 6.

In some cases, if an identity of the user is known to the contact center (e.g., based on the user specifying their identity, based on a telephone number or Internet Protocol address associated with the user, or based on a cookie stored at the user device 502), information about the user may be used by the deployment engines 604A-C. For example, the "cancel subscription" deployment engine may leverage knowledge that the user has a paid subscription with the online store to conclude that the user might really want to cancel their paid subscription without closing their free account in response to requesting to close their account.

During computation, each deployment engine 604A-C is initially assigned one third of the available computing resources. By observing the operation of the deployment engines 604A-C, the controller engine 806 determine that the deployment engine 604A is not using its available processors while the deployment engine 604B requires additional processors. Thus, some processors may be reassigned from the deployment engine 604A to the deployment engine 604B. After completing their computations, the deployment engine 604A-C return scores representing the probabilities that the query matches to their associated intents. For example, the scores may be 40% for close account, 45% for cancel subscription, and 15% for purchase product.

The query processing engine takes the intents for which the probabilities exceed 33%—close account and cancel subscription—and generates an aggregated response message to the user to select the appropriate intent. Since the user is calling over the PSTN, the aggregated response message may be "press 1 to cancel your subscription or press 2 to close your account." The user then presses 1 on the telephone keypad (causing an indication that 1 was pressed to be transmitted to the contact center) and the user is connected to a human customer service agent who can assist with cancelling the subscription. Alternatively, if the user's identity is determined (e.g., based on the telephone number from which the user is calling), the user's subscription may be automatically cancelled by the contact center.

In summary, a contact center service that serves multiple entities (e.g., a contact center service of a UCaaS platform which serves banks, online stores, delivery service providers, and/or government agencies) stores, in the intent data repository 802, global intents that apply to multiple different entities (e.g., the intent "close account" or "change billing address" may apply to multiple different entities) and entity-specific intents for each entity (e.g., a bank may have a different set of entity-specific intents than an online store). Each of the intents 804A-C may be associated with the deployment engine 604A-C that processes the intent. Each deployment engine 604A-C may reside at its own server, or multiple deployment engines may share a server. Alternatively, servers (or other computing resources) may be dynamically assigned to the deployment engines 604A-C by the controller engine 806. When the user accesses the contact center via the user device 502, the query processing engine 602 receives the query 606 from the user device 502, along with an identification of the entity being contacted and, in some cases, identifying information of the user. The query processing engine 602 transmits the query to the deployment engines 604A-C for the global intents and the deployment engines 604A-C for the entity-specific intents of the entity. Each of at least a subset of the deployment engines 604A-C return the score 608A-C representing a likelihood that the query 602 matches to the intent 804A-C associated with the deployment engine 604A-C. If the score 608A-C exceeds a threshold, the associated intent is added to a set of candidate intents for the query 602. The set of candidate intents is transmitted to the user device 502 in the aggregated response 610 to the query 606. At the user device 502, the user selects their correct intent. The user device 502 transmits the correct intent to the server 504, and the server 504 executes the workflow 706 corresponding to the correct intent.

Figure 9:
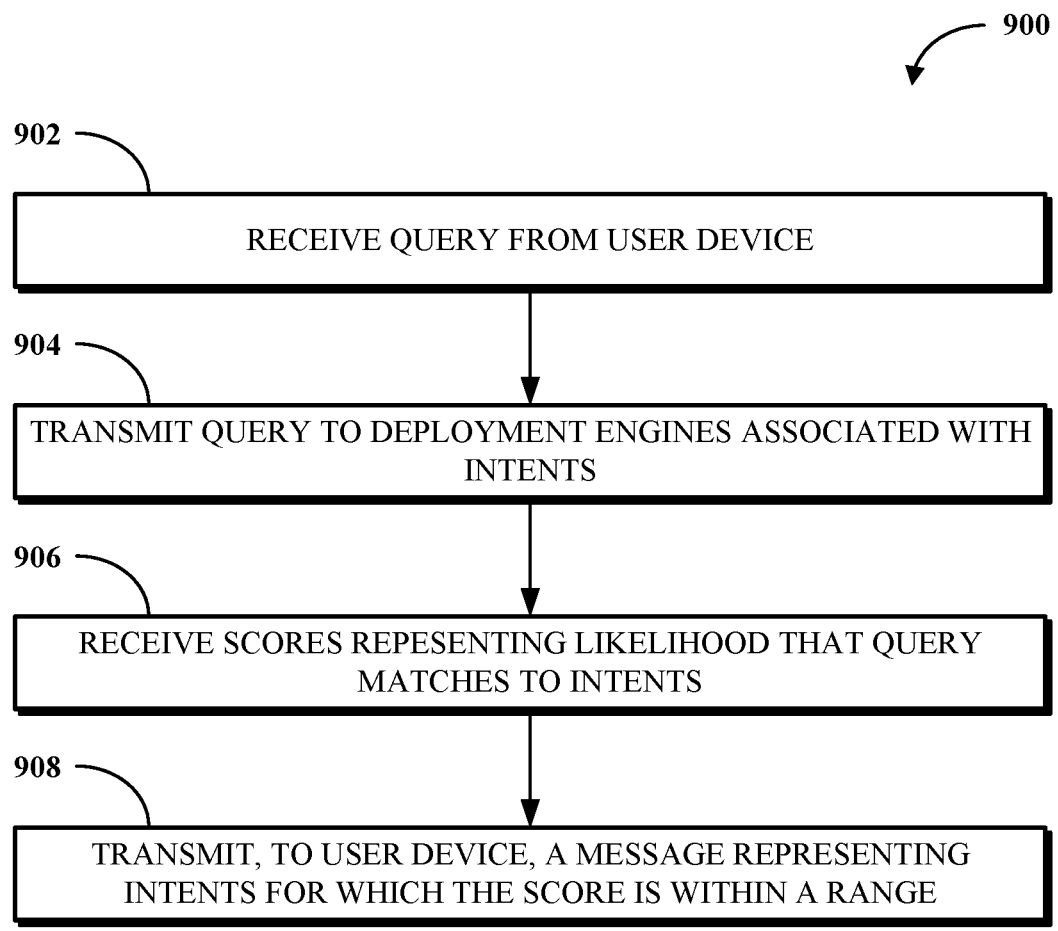
FIG. 9 is a flowchart of an example of a technique for intent matching.

To further describe some implementations in greater detail, reference is next made to examples of techniques for intent matching. FIG. 9 is a flowchart of an example of a technique 900 for intent matching. The technique 900 can be executed using computing devices, such as the systems, hardware, and software described with respect to FIGS. 1-8. The technique 900 can be performed, for example, by executing a machine-readable program or other computer-executable instructions, such as routines, instructions, programs, or other code. The steps, or operations, of the technique 900 or another technique, method, process, or algorithm described in connection with the implementations disclosed herein can be implemented directly in hardware, firmware, software executed by hardware, circuitry, or a combination thereof.

For simplicity of explanation, the technique 900 is depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

At 902, a query processing engine (e.g., the query processing engine 602) at a server (e.g., the server 504) receives a query from a user device (e.g., the user device 502). The server is associated with a contact center. The user device may be a computer accessing a web-based or application-based interface of the contact center or a telephone accessing the contact center via the PSTN.

At 904, the query processing engine transmits the query to multiple deployment engines (e.g., the deployment engines 604A-C). Each of the multiple deployment engines is associated with an intent and computes a score representing a likelihood that the query matches to the associated intent. Prior to transmission of the query to the multiple deployment engines, the query processing engine may pre-process the query, for example, to convert the query into a standardized format. The standardized format may be a numeric vector representing meaning or English language text.

At 906, the query processing engine receives a score from each of a subset of the multiple deployment engines in response to the query. The score represents a likelihood that the query matches to the associated intent. The score may be computed at each deployment engine, for example, using statistical techniques.

In some implementations, the technique 900 includes computing one or more of the scores. Each score is computed using one of the deployment engines. The score may be computed using a statistical or artificial intelligence technique. In some examples, a CNN may be used. The CNN may be trained using a training set that includes queries that match to the associated intent and queries that do not match to the associated intent. A rule-based technique may be used in addition to or in place of the CNN. In the rule-based technique, the rules may be manually entered by an operator. For example, any query including the phrase "change billing address," may be matched to the intent "change billing address" with a score of 100%. A query that does not include this exact phrase may have its score computed using the CNN of the deployment engine for the intent "change billing address."

In some cases, some of the deployment engines are part of the contact center and some of the deployment engines are external to the contact center. For example, the intent "change billing address" may be common to many entities using the contact center. Thus, the contact center may develop a deployment engine for the intent "change billing address." Other intents, for example, "request oil tank refill" may only be applicable to a few of the entities or a single entity. In this case, the entity may provide the deployment engine for the intent, and the deployment engine may only be accessed for queries associated with the entity (and not for queries associated with other entities that use the contact center).

At 908, the query processing engine transmits, to the user device in response to the query, a message comprising representations of intents for which the score is within a predefined range. The message may include at least one of text, an audio recording, a video recording, or a hyperlink. For example, if the message is to be transmitted via the PSTN, the message may include a request for the user to press a telephone key corresponding to the correct intent. If the message is to be transmitted to a computer connected to the Internet, the message may include multiple hyperlinks associated with intents, and the user may be asked to select the hyperlink that corresponds to the correct intent. The predefined range may be exceeding (or, alternatively, being below) a predefined threshold value. In some cases, to avoid confusing the user, at most n intents are included in the message, where n is a preset positive integer. For example, if the user is accessing the contact center by PSTN, n may be 10 as there are 10 digits on a telephone keypad, and the user may use those digits to select their correct intent. The message may be a single message (e.g., the aggregated response 610) aggregating the intents for which the score is within the predefined range. After receiving the message, the user device may receive a user input representing the correct intent. The correct intent may be transmitted to the server. The server may execute a workflow corresponding to the correct intent.

Some implementations are described below as numbered examples (Example 1,2,3, etc.). These examples are provided as examples only and do not limit the other implementations disclosed herein.

Example 1 is a method, comprising: transmitting a query received from a user device to multiple deployment engines, each deployment engine being associated with an intent; receiving, from each of a subset of the multiple deployment engines, a score representing a likelihood that the query matches to the associated intent; and transmitting, to the user device, a message comprising representations of intents for which the score is within a predefined range.

In Example 2, the subject matter of Example 1 includes, the message being a single message aggregating the intents for which the score is within the predefined range.

In Example 3, the subject matter of Examples 1-2 includes, the score being within the predefined range comprising the score exceeding a predefined threshold value.

In Example 4, the subject matter of Examples 1-3 includes, the multiple deployment engines comprising global deployment engines associated with global intents and entity-specific deployment engines associated with specific intents for an entity.

In Example 5, the subject matter of Examples 1-4 includes, receiving the query at a contact center server and from the user device.

In Example 6, the subject matter of Examples 1-5 includes, the multiple deployment engines being controlled by a controller engine that accesses a data repository of intents and generates a deployment engine for at least one intent from the data repository.

In Example 7, the subject matter of Examples 1-6 includes, the multiple deployment engines being controlled by a controller engine that assigns multiple computing nodes to the multiple deployment engines based on computations being processed by the multiple deployment engines, each computing node representing a set of computational resources.

In Example 8, the subject matter of Examples 1-7 includes, the message comprising representations of fewer than a preset threshold number of intents.

Example 9 is a non-transitory computer readable medium storing instructions operable to cause one or more processors to perform operations comprising: transmitting a query received from a user device to multiple deployment engines, each deployment engine being associated with an intent; receiving, from each of a subset of the multiple deployment engines, a score representing a likelihood that the query matches to the associated intent; and transmitting, to the user device, a message comprising representations of intents for which the score is within a predefined range.

In Example 10, the subject matter of Example 9 includes, the message being a single message aggregating the representations of the intents.

In Example 11, the subject matter of Examples 9-10 includes, the score being within the predefined range comprising the score being below a predefined threshold value.

In Example 12, the subject matter of Examples 9-11 includes, the multiple deployment engines comprising at least one global deployment engine associated with global intents and at least one entity-specific deployment engine associated with specific intents for an entity.

In Example 13, the subject matter of Examples 9-12 includes, receiving the query at a contact center server.

In Example 14, the subject matter of Examples 9-13 includes, the multiple deployment engines being controlled by a controller engine, the controller engine accessing a data repository of intents and generating the multiple deployment engines for intents from the data repository.

In Example 15, the subject matter of Examples 9-14 includes, the multiple deployment engines being controlled by a controller engine that assigns multiple computing nodes to the multiple deployment engines, each computing node representing a set of computational resources, the controller engine assigning at least one computing node to at least one deployment engine based on computations being processed by the at least one deployment engine.

In Example 16, the subject matter of Examples 9-15 includes, the message comprising representations of at most n intents, n being a preset positive integer.

Example 17 is an apparatus comprising: a memory; and a processor configured to execute instructions stored in the memory to: transmit a query received from a user device to multiple deployment engines, each deployment engine being associated with an intent; receive, from each of a subset of the multiple deployment engines, a score representing a likelihood that the query matches to the associated intent; and transmit, to the user device, a message comprising representations of intents for which the score is within a predefined range.

In Example 18, the subject matter of Example 17 includes, the message being a single message aggregating the representations of the intents for which the score is within the predefined range.

In Example 19, the subject matter of Examples 17-18 includes, the multiple deployment engines comprising at least one of a global deployment engine associated with a global intent or an entity-specific deployment engine associated with a specific intent for an entity.

In Example 20, the subject matter of Examples 17-19 includes, the multiple deployment engines being controlled by a controller engine, the controller engine accessing a database of intents and generating a deployment engine for at least one intent from the database.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. The quality of memory or media being non-transitory refers to such memory or media storing data for some period of time or otherwise based on device power or a device power cycle. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising:
   transmitting a query received from a user device to multiple deployment engines, each deployment engine being associated with an intent and the multiple deployment engines being controlled by a controller engine that accesses a data repository of intents and generates a deployment engine for at least one intent from the data repository;
   receiving, from each of a subset of the multiple deployment engines, a score representing a likelihood that the query matches to the intent; and
   transmitting, to the user device, a message comprising representations of intents for which the score is within a predefined range.

2. The method of claim 1, the message being a single message aggregating the intents for which the score is within the predefined range.

3. The method of claim 1, the score being within the predefined range comprising the score exceeding a predefined threshold value.

4. The method of claim 1, the multiple deployment engines comprising global deployment engines associated with global intents and entity-specific deployment engines associated with specific intents for an entity.

5. The method of claim 1, comprising:
   receiving the query at a contact center server and from the user device.

6. The method of claim 1, further comprising:
   assigning, by the controller engine, multiple computing nodes to the multiple deployment engines based on computations being processed by the multiple deployment engines, each computing node representing a set of computational resources.

7. The method of claim 1, the message comprising representations of fewer than a preset threshold number of intents.

8. A non-transitory computer readable medium storing instructions operable to cause one or more processors to perform operations comprising:
   transmitting a query received from a user device to multiple deployment engines, each deployment engine being associated with an intent and the multiple deployment engines being controlled by a controller engine that accesses a data repository of intents and generates a deployment engine for at least one intent from the data repository;
   receiving, from each of a subset of the multiple deployment engines, a score representing a likelihood that the query matches to the intent; and
   transmitting, to the user device, a message comprising representations of intents for which the score is within a predefined range.

9. The non-transitory computer readable medium of claim 8, the message being a single message aggregating the representations of the intents.

10. The non-transitory computer readable medium of claim 8, the score being within the predefined range comprising the score being below a predefined threshold value.

11. The non-transitory computer readable medium of claim 8, the multiple deployment engines comprising at least one global deployment engine associated with global intents and at least one entity-specific deployment engine associated with specific intents for an entity.

12. The non-transitory computer readable medium of claim 8, the operations further comprising:
receiving the query at a contact center server.

13. The non-transitory computer readable medium of claim 8, wherein the controller engine assigns multiple computing nodes to the multiple deployment engines, each computing node representing a set of computational resources, the controller engine assigning at least one computing node to at least one deployment engine based on computations being processed by the at least one deployment engine.

14. The non-transitory computer readable medium of claim 8, the message comprising representations of at most n intents, n being a preset positive integer.

15. An apparatus comprising:
a memory; and
a processor configured to execute instructions stored in the memory to:
transmit a query received from a user device to multiple deployment engines, each deployment engine being associated with an intent and the multiple deployment engines being controlled by a controller engine that accesses a data repository of intents and generates a deployment engine for at least one intent from the data repository;
receive, from each of a subset of the multiple deployment engines, a score representing a likelihood that the query matches to the intent; and
transmit, to the user device, a message comprising representations of intents for which the score is within a predefined range.

16. The apparatus of claim 15, the message being a single message aggregating the representations of the intents for which the score is within the predefined range.

17. The apparatus of claim 15, the multiple deployment engines comprising at least one of a global deployment engine associated with a global intent or an entity-specific deployment engine associated with a specific intent for an entity.

18. The apparatus of claim 15, the score being within the predefined range comprising the score exceeding a predefined threshold value.

19. The apparatus of claim 15, the query being received at a contact center server and from the user device.

20. The apparatus of claim 15, the message comprising representations of fewer than a preset threshold number of intents.

* * * * *